May 20, 1958     J. V. OLIVEAU     2,835,251
DISCONNECTS FOR ELECTRIC CIRCUITS AND AIR AND
OXYGEN SUPPLY CONDUITS
Filed Oct. 3, 1956     2 Sheets-Sheet 1
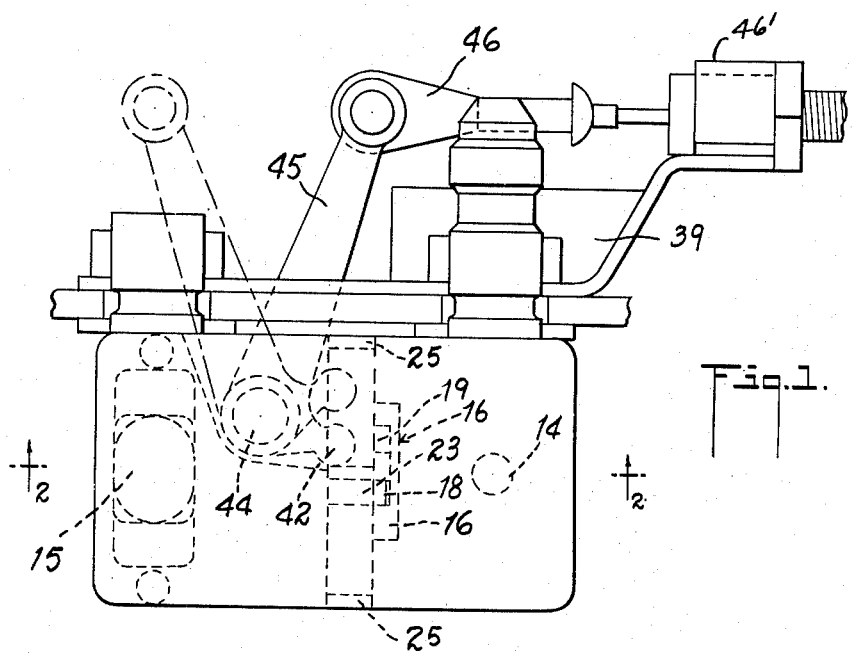
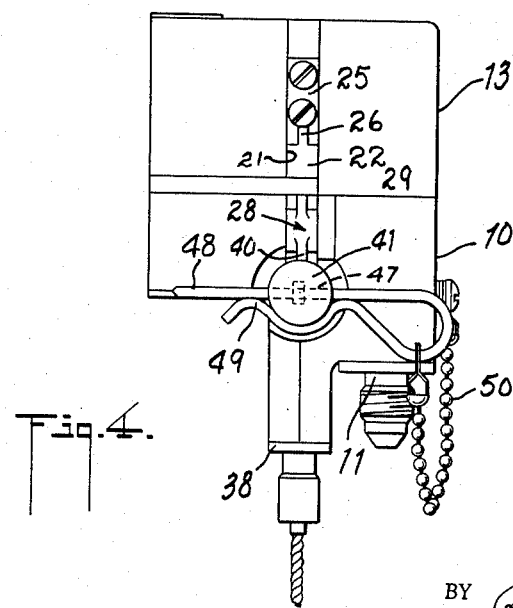
INVENTOR.
JOHN V. OLIVEAU
BY Benj. T. Rauber
ATTORNEY

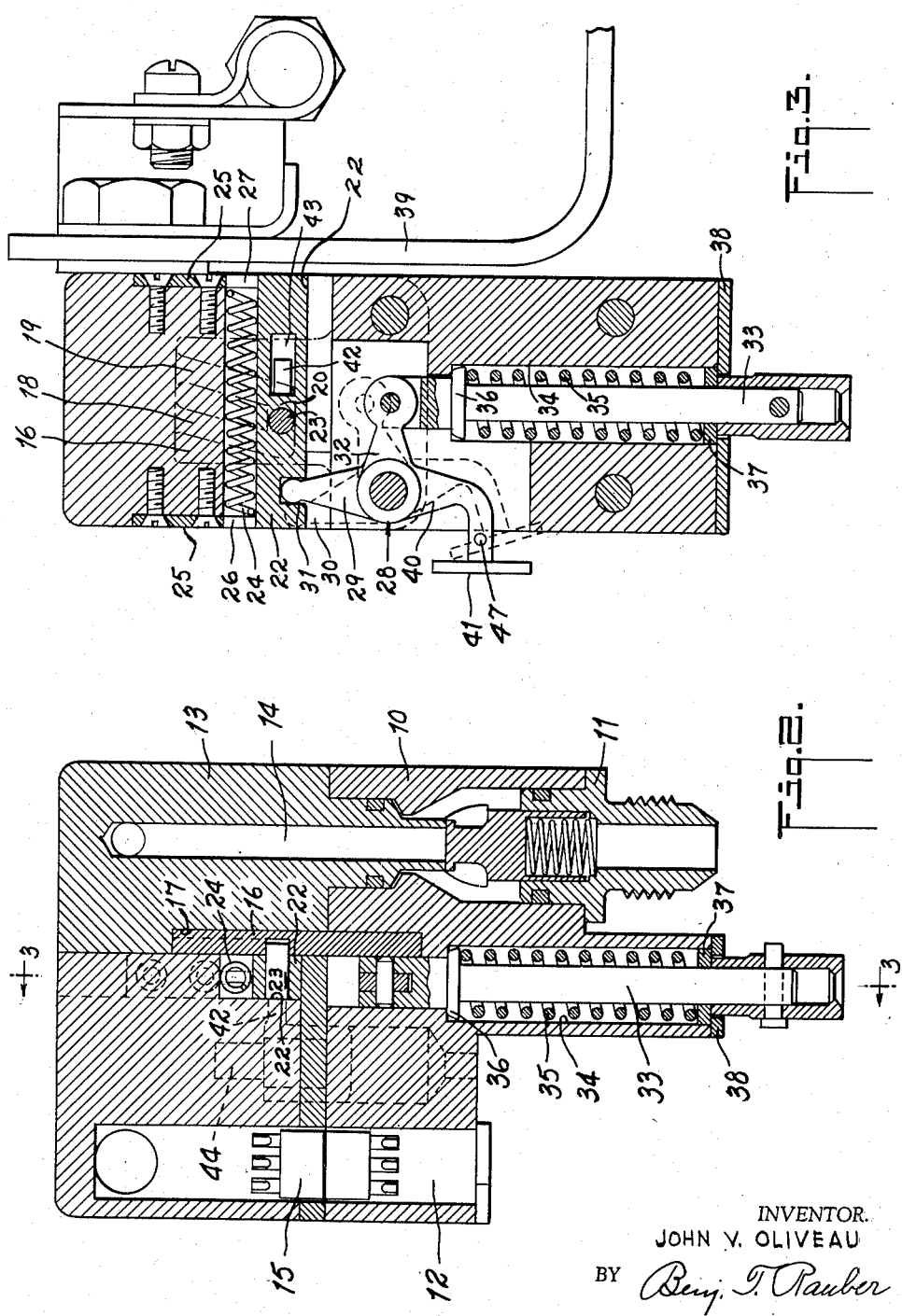

United States Patent Office 2,835,251
Patented May 20, 1958

2,835,251

DISCONNECTS FOR ELECTRIC CIRCUITS AND AIR AND OXYGEN SUPPLY CONDUITS

John V. Oliveau, Greenwich, Conn., assignor to The Aerotec Corporation, Greenwich, Conn., a corporation of Connecticut Application October 3, 1956, Serial No. 613,785

7 Claims. (Cl. 128—142)

My invention relates to improvements in disconnects for electric circuits and air and oxygen supply conduits to the pressurized suits of aircraft personnel at high altitudes.

A disconnect of the above type serves to connect the suit to the supply equipment of the aircraft when the wearer is in the aircraft in normal flight but, when the wearear must bail out and is ejected, automatically disconnects the supply lines and "triggers" or places in readiness for use an emergency oxygen supply carried by the suit to furnish a sufficient supply while the wearer parachutes to the earth. The disconnect comprises a part, generally a lower part, fixed to the aircraft and an upper part attached to the suit. As the wearer is ejected, the upper part separates from the lower part and a mechanism is actuated or "triggered" by the separation to make available the emergency oxygen supply.

In servicing the equipment, it is necessary quickly to disengage the lower part of the disconnect from the upper part in order to remove the survival kit. However, it is not desirable to trigger the emergency oxygen supply when the parts are separated for this purpose.

My invention enables this to be done, that is, it enables the parts to be separated without triggering the emergency oxygen supply upon their separation.

In my invention the upper and lower parts of the disconnect are locked together by a mechanism which may be unlocked automatically and the emergency oxygen supply triggered when the wearer is ejected and which may be unlocked manually without triggering the emergency oxygen supply. Preferably the locking mechanism comprises a blade extending upwardly from the lower part and having an upwardly opening, U-shaped groove in one side face. The upper part has an upwardly extending slot into which the blade is inserted upwardly when the parts are assembled and a shuttle slidable horizontally at one side of the slot and carrying a pin projecting sidewise of the shuttle to slide in the U-shaped slot. The shuttle is normally held in mid position with the pin in the bight of the slot by a spring which permits shifting of the shuttle forwardly or rearwardly of mid position to bring the pin into alignment with either of the upwardly extending branches of the slot. When assembled with the pin in the bight of the slot, the pin prevents the upward movement of the shuttle and upper part and holds the parts in assembled position. When the shuttle is shifted rearwardly or forwardly from mid position to alignment with either of the upwardly extending, upwardly open, branches of the slot the upper part and shuttle may be moved upwardly from the lower part. The shuttle is also connected to a triggering mechanism, preferably by a lever, to operate the triggering mechanism when moved in one direction, rearwardly for example, from central position but moves free of the triggering mechanism when moved in the opposite direction.

The shuttle is moved in one direction from its central position, rearwardly for example, to unlock the parts and trigger the reserve oxygen supply when the wearer of the suit, for example the pilot, is ejected by means of a connection to the aircraft and is movable manually in the opposite direction to unlock the parts but without triggering the reserve oxygen supply. This is preferably accomplished by a common lever having three arms, one of which engages a slot in the shuttle, the second of which is connected to a lanyard fixed to the aircraft to turn the lever in one direction and the third of which has an end or knob projecting from the disconnect to be manually operated to turn the lever in the opposite direction. This lever is mounted in the lower disconnect part.

The various features of my invention are illustrated by way of example in the accompanying drawings in which:

Fig. 1 is a plan view of a disconnect embodying a preferred form of the invention, Fig. 2 is a vertical section of the disconnect taken on line 2—2 of Fig. 1, Fig. 3 is a vertical section taken on line 3—3 of Fig. 2 and, Fig. 4 is a front elevation of the lower part of the disconnect.

In the embodiment illustrated in the accompanying drawings, the disconnect comprises a lower part 10 having the usual inlets 11 for air and oxygen and 12 for electric connections and an upper part 13 having outlet passages 14 to connect with the inlets 11 and terminal connectors 15 to connect with the connections 12.

The lower part 10 has fixed integrally thereto an upwardly extending blade 16 to project upwardly into a slot or narrow recess 17 extending upwardly from the lower surface of the upper part. In the left face of the blade as viewed in Fig. 2 is a U-shaped groove comprising a forward branch 18, Fig. 3, a rear branch 19, both opening upwardly and a lower connecting bight 20. The branches 18 and 19 are substantially parallel and slope upwardly and rearwardly as shown in Fig. 3.

At the lower part of the slot or recess 17 is a horizontal guideway 21 in which is slidably mounted a shuttle 22 from which extends sidewise a pin 23 to enter the U-shaped groove 18—20. The shuttle 22 is normally held in mid position with the pin 23 in mid position of the bight 20 by a spring 24 in a recess immediately above the shuttle and confined between the ends 25 of the recess as shown in Fig. 2. The ends of the recess have slots extending upwardly from the lower part of the recess in which may slide upward extensions of the shuttle 22, one extension 26 being at the front of the shuttle and the other 27 being at the other end. When the shuttle moves forwardly the spring is compressed between the extension 27 and the front end of the recess and when it moves rearwardly the spring is compressed between the extension 26 and the rear of the recess.

The shuttle 22 is moved alternatively to forward or rearward position by a lever 28, pivoted in the lower part and having an upwardly extending arm 29 extending through a slot 30 in the upper part into a notch 31 in the lower side of the shuttle. When the lever 28 is rotated clockwise the arm 29 swings rearwardly carrying the shuttle with it. The lever 28 also has a rearwardly extending arm 32 the end of which is connected to a vertically slidable rod 33 extending through a vertical recess 34. The rod is normally held in its upper position as shown in full lines in Fig. 3 by a coil spring 35 confined between a flange 36 fixed on the rod and a washer 37 held by a plate 38 secured to the lower face of the lower part. The rod 33 is attached by a lanyard, not shown, to the aircraft.

The upper part is mounted on a bracket 39 secured to the seat, which is ejected with the pilot or other personnel. As the upper part moves upwardly carrying the lower part with it, the rod 33 is held after a limited movement and thus moves downwardly relative to the disconnect thereby rotating the lever 28 clockwise. This moves the shuttle rearwardly to bring the pin 23 into alignment with the rear branch 19 of the groove so that the pin may move upwardly in the branch 19 to the open end thereof, releasing the upper part from the lower part. The lever 28 may be rotated counterclockwise by a downwardly extending arm 40 having a forwardly extending knob 41 which may be pressed rearwardly to the position shown in broken lines in Fig. 3 to bring the pin 23 into alignment with the forward branch 18 through which it may be withdrawn.

When the shuttle moves rearwardly it moves a lever arm 42 which projects into a transverse slot 43 in the shuttle and is pivoted on a vertical pivot pin 44 in the upper part 13. The lever arm 42 is integral with a rearwardly extending arm 45, Fig. 1, which is, in turn, connected with a triggering mechanism indicated at 46 in Fig. 1. When the parts are in their normal position as shown in Fig. 3, the end of the lever arm 42 is in contact with the forward end of the slot 43 so that the lever arm moves with the slot. As the pin 23 travels upwardly in the branch 19 the rearward slope of the groove carries the shuttle 22 and the lever arms 42 and 45 further to the rear to complete the triggering of the reserve oxygen supply of which the supply control valve to be triggered is indicated at 46′, Fig. 1.

When the shuttle is moved forwardly by manual pressure on the knob 41 there is a slip or loose connection between the shuttle and the triggering mechanism that permits the shuttle to move forwardly without actuating the trigger mechanism. In the embodiment shown by way of example in the drawings, this is accomplished by making the slot 43 of a greater length or dimension front to rear than the width of the end of the lever arm 42 so that the shuttle may move far enough forwardly to bring the pin 23 into alignment with the forward branch 18 of the groove without contacting and moving the lever arm. As the pin 23 moves upwardly the rearward slope of this branch returns the pin and shuttle to their normal position. In assembling the parts the pin in its normal position may enter the branch 18 of the slot, travel downwardly to the bight 20 without actuating the lever arms 42 and 45 and then be returned to normal position by the spring 24.

To prevent inadvertent pressing rearwardly of the knob 41, the stem of the knob is provided with a hole 47 through which may be passed a safety pin 48, Fig. 4, provided with a spring arm 49 curved to engage and grip the knob when the pin is inserted through the hole 47. A chain 50 serves to attach the pin to the lower part 11 so that it will not be lost when withdrawn.

Having described my invention, what I claim is:

1. A disconnect for a suit of aircraft personnel and for triggering an emergency oxygen supply to said suit which comprises a lower part and an upper part separable therefrom, said lower part having an upwardly extending locking blade having an upwardly opening U-shaped groove in one side face, said upper part having a slot extending upwardly from the bottom of said upper part to receive said locking blade, a horizontally slidable shuttle in said upper part having a pin extending from one side to move in said U-shaped groove to lock said parts together when said pin extends into the bight of said groove, a spring to hold said shuttle in midposition, manually operable means to move said shuttle forwardly against the action of said spring to bring the pin into alignment with the forward branch of said groove, means to move said shuttle rearwardly upon upward movement of the disconnect to bring said pin into alignment with the rear branch of said groove, and a triggering mechanism having an operating element engaged by the shuttle on its rearward movement from central position to trigger an emergency oxygen supply and disengaged from said shuttle on movement forwardly from central position.

2. The disconnect of claim 1 in which the rear branch of said U-shaped groove slopes upwardly and rearwardly.

3. The disconnect of claim 1 in which both branches of said U-shaped groove slope upwardly and rearwardly.

4. The disconnect of claim 1 in which said spring is a coil spring in a recess closed at its forward and rear ends and in which each end of said shuttle has a projection into an opening in the adjacent end of the recess.

5. The disconnect of claim 4 in which said triggering mechanism comprises a pivoted actuating lever projecting into an opening in said shuttle, abutting the forward end of said opening when said shuttle is in midposition and having a clearance from the rear end of said opening when the shuttle is in midposition.

6. A disconnect for the suits of aircraft personnel which comprises a lower part and an upper part separable therefrom, said lower part having an upwardly extending blade having an upwardly opening U-shaped groove in one side face, said upper part having an upwardly extending slot to receive said blade, a horizontally slidable shuttle in said upper part having a sidewise extending pin to move in said U-shaped groove and having a transverse opening and a downwardly opening notch, a shuttle spring to hold said shuttle in midposition with the pin in the lower bight of the U-shaped groove to lock said parts together and to permit said shuttle to move to align said pin with either of the upwardly extending branches of said groove to unlock said parts, a plunger in said lower part movable upwardly and downwardly therein, a plunger spring biasing said plunger upwardly, a release lever in said lower part having a manually operable arm, an arm connected to said plunger and an arm extending into said notch in said shuttle so that downward movement of said plunger will move said shuttle rearwardly and actuation of said manually operable arm will move said shuttle forwardly from central position and a triggering mechanism for the emergency oxygen supply having an operating arm extending into said transverse opening in said shuttle in contact with the forward end of said opening when said shuttle is in midposition to trigger said mechanism when said shuttle moves rearwardly and spaced from the rear end of said opening to permit said shuttle to move forwardly without moving said mechanism.

7. The disconnect of claim 6 in which the branches of said U-shaped groove slope upwardly and rearwardly and in which said shuttle spring is a coil spring enclosed in a recess extending from front to rear in said upper part and closed at its ends, said ends having upwardly extending notches and said shuttle having an upward projection at each end extending into the notch at its respective end of the recess.

References Cited in the file of this patent

UNITED STATES PATENTS 2,302,707    Mejean _____ Nov. 24, 1942